(12) United States Patent
Durso

(10) Patent No.: US 7,109,977 B2
(45) Date of Patent: Sep. 19, 2006

(54) SLIPCOVER TOUCH INPUT APPARATUS FOR DISPLAYS OF COMPUTING DEVICES

(75) Inventor: Nick P. Durso, Canyon Country, CA (US)

(73) Assignee: T2D, Inc., Valencia, CA (US)

(*) Notice: Subject to any disclaimer, the term of this patent is extended or adjusted under 35 U.S.C. 154(b) by 482 days.

(21) Appl. No.: 10/679,930

(22) Filed: Oct. 5, 2003

(65) Prior Publication Data

US 2005/0073504 A1    Apr. 7, 2005

(51) Int. Cl.
G09G 5/00 (2006.01)

(52) U.S. Cl. ............... 345/173; 361/681; 178/18.03
(58) Field of Classification Search ............. 345/173; 178/18.01, 18.03; 361/679–683
See application file for complete search history.

(56) References Cited

U.S. PATENT DOCUMENTS

| | | | |
|---|---|---|---|
| 3,673,327 A | 6/1972 | Johnson | |
| 4,220,815 A | 9/1980 | Gibson | |
| 4,346,376 A | 8/1982 | Mallos | |
| 4,545,023 A | 10/1985 | Mizzi | |
| 4,692,809 A | 9/1987 | Beining | |
| 4,821,030 A | 4/1989 | Batson | |
| 5,025,411 A | 6/1991 | Tallman | |
| 5,128,662 A | 7/1992 | Failla | |
| 5,233,502 A * | 8/1993 | Beatty et al. ............... 361/681 |
| 5,283,862 A | 2/1994 | Lund | |
| 5,341,154 A | 8/1994 | Bird | |
| 5,379,057 A | 1/1995 | Clough | |
| 5,469,194 A | 11/1995 | Clark | |
| 5,543,588 A | 8/1996 | Bisset | |
| 5,555,490 A | 9/1996 | Carroll | |
| 5,572,401 A | 11/1996 | Carroll | |
| 5,594,471 A | 1/1997 | Deeran | |
| 5,675,362 A | 10/1997 | Clough | |
| 5,697,793 A | 12/1997 | Huffman | |
| 5,702,166 A | 12/1997 | Lee | |
| 5,761,485 A | 6/1998 | Munyan | |
| 5,768,386 A | 6/1998 | Yokomoto | |
| 5,847,698 A | 12/1998 | Reavey | |
| 5,870,282 A | 2/1999 | Andreet | |
| 5,880,411 A | 3/1999 | Gillespie | |
| 5,931,297 A | 8/1999 | Weill | |
| 5,953,199 A | 9/1999 | Owens | |
| 5,999,155 A | 12/1999 | Satou | |
| 6,005,767 A | 12/1999 | Ku | |

(Continued)

FOREIGN PATENT DOCUMENTS

EP   0 181 196   *   5/1986

(Continued)

OTHER PUBLICATIONS

Troll Touch Website, 26 pages of printouts from http://www.trolltouch.com.

(Continued)

Primary Examiner—Regina Liang
(74) Attorney, Agent, or Firm—Law Office of David Hong

(57) ABSTRACT

This invention provides a slipcover touch input apparatus and structure for displays for computing devices that converts a non-touch screen display to a touch screen display. The slipcover assembly acts as a sheath or cover for the display, and the touch screen is mounted in a window or opening of the casing of the display so that the touch screen is oriented to mimic the position of the display. This touch screen slipcover can convert any display of a computing device into a touch screen display.

12 Claims, 9 Drawing Sheets

U.S. PATENT DOCUMENTS

| | | | |
|---|---|---|---|
| 6,075,504 | A | 6/2000 | Stoller |
| 6,088,069 | A | 7/2000 | Farlow |
| 6,118,436 | A * | 9/2000 | Kushita .................... 345/173 |
| 6,125,033 | A | 9/2000 | Andre |
| 6,149,001 | A | 11/2000 | Akins |
| 6,151,005 | A | 11/2000 | Takita |
| 6,163,313 | A | 12/2000 | Aroyan |
| 6,259,597 | B1 | 7/2001 | Anzai |
| 6,262,717 | B1 | 7/2001 | Donohue |
| 6,267,236 | B1 | 7/2001 | Seok |
| 6,357,887 | B1 | 3/2002 | Novak |
| 6,363,796 | B1 | 4/2002 | Jiang |
| 6,369,795 | B1 | 4/2002 | Lester |
| 6,383,931 | B1 | 4/2002 | Gillespie |
| 6,392,636 | B1 | 5/2002 | Ferrari |
| 6,402,269 | B1 | 6/2002 | Roth |
| 6,414,671 | B1 | 7/2002 | Gillespie |
| 6,414,674 | B1 | 7/2002 | Kamper |
| 6,424,338 | B1 | 7/2002 | Andreson |
| 6,437,774 | B1 | 8/2002 | Tsuji |
| 6,480,377 | B1 | 11/2002 | Genest |
| 6,492,979 | B1 | 12/2002 | Kent |
| 6,504,530 | B1 | 1/2003 | Wilson |
| 6,587,097 | B1 | 7/2003 | Aufderheide |
| 2002/0118177 | A1 | 8/2002 | Newton |
| 2002/0126102 | A1 | 9/2002 | Redmayne |
| 2002/0181190 | A1 | 12/2002 | Callado |

FOREIGN PATENT DOCUMENTS

| | | | |
|---|---|---|---|
| EP | 1018680 A2 | | 7/2000 |
| JP | 406110609 | * | 4/1994 |
| JP | 2000311059 | * | 11/2000 |
| JP | 2002023952 | * | 1/2002 |
| WO | WO 00-50979 A1 | | 8/2000 |

OTHER PUBLICATIONS

Troll Touch Website, copy of Macworld article, "Touch Screen Enhances iMac Kiosks," on or about Nov. 1999, 2 pages.

Sellers, D., "Touchscreen system for new iBooks announced," MacWorld Website, May 17, 2001, 7 pages.

Troll Touch Website, "TouchStar2 touch screen system for Apple LCD iMac," Press Release for Mar. 26, 2002, 2 pages.

Mac-Upgrade.com, "Troll Touch offers Touch Screen for iMac G4,"Mar. 28, 2002, 3 pages.

Troll Touch, "TouchSTAR Enhancement for Apple Cinema Displays,"Jul. 1, 2003, 4 pages.

Kioskcom.com, "TouchSTAR Enhancement for Apple 20" & 23" HD Cinema Displays Shipping," Jul. 2, 2003, 1 page.

Troll Touch, Advertisement for "iBook Laptop Touchscreen," 1 page.

Troll Touch, Advertisement for "TouchStar iMac," 1 page.

Troll Touch, 6 photos at Worldwide Web Developers Conf., San Francisco, CA, showing non-working prototype of "Slipcover Touch Input Apparatus," about Jun. 22, 2003, 6 pages.

Troll Touch, Advertisement for "Portable Touchscreen System," on or about Jul. 12, 1996, 1 page.

Troll Touch Website, http://www.trolltouch.com/pages/products/ad-donscreens.html, on or about Jul. 12, 1996, 2 pages.

Troll Touch Website, http://www.trolltouch.com/news.html, printed Jul. 9, 2003 referring to various dates, 5 pages.

Troll Touch Website, http://www.trolltouch.com/pages/products/plasma.html, on or about Jul. 7, 1998, 2 pages.

Troll Touch, Advertisement for "TouchStar 50 System," on or about Jul. 7, 1998, 1 page.

Troll Touch, Advertisement for "Laptop Touchscreen Enclosure—the Wedge"on or about Jun. 1996, 1 page.

Troll Touch, Advertisement for "Multimedia Kiosk," on or about Apr. 1995, 1 page.

Printout from www.Touchscreens.com; "How Does a Touchscreen Work and Comparing Touchscreen Technologies." Oct. 5, 2003, p. 1-15.

* cited by examiner

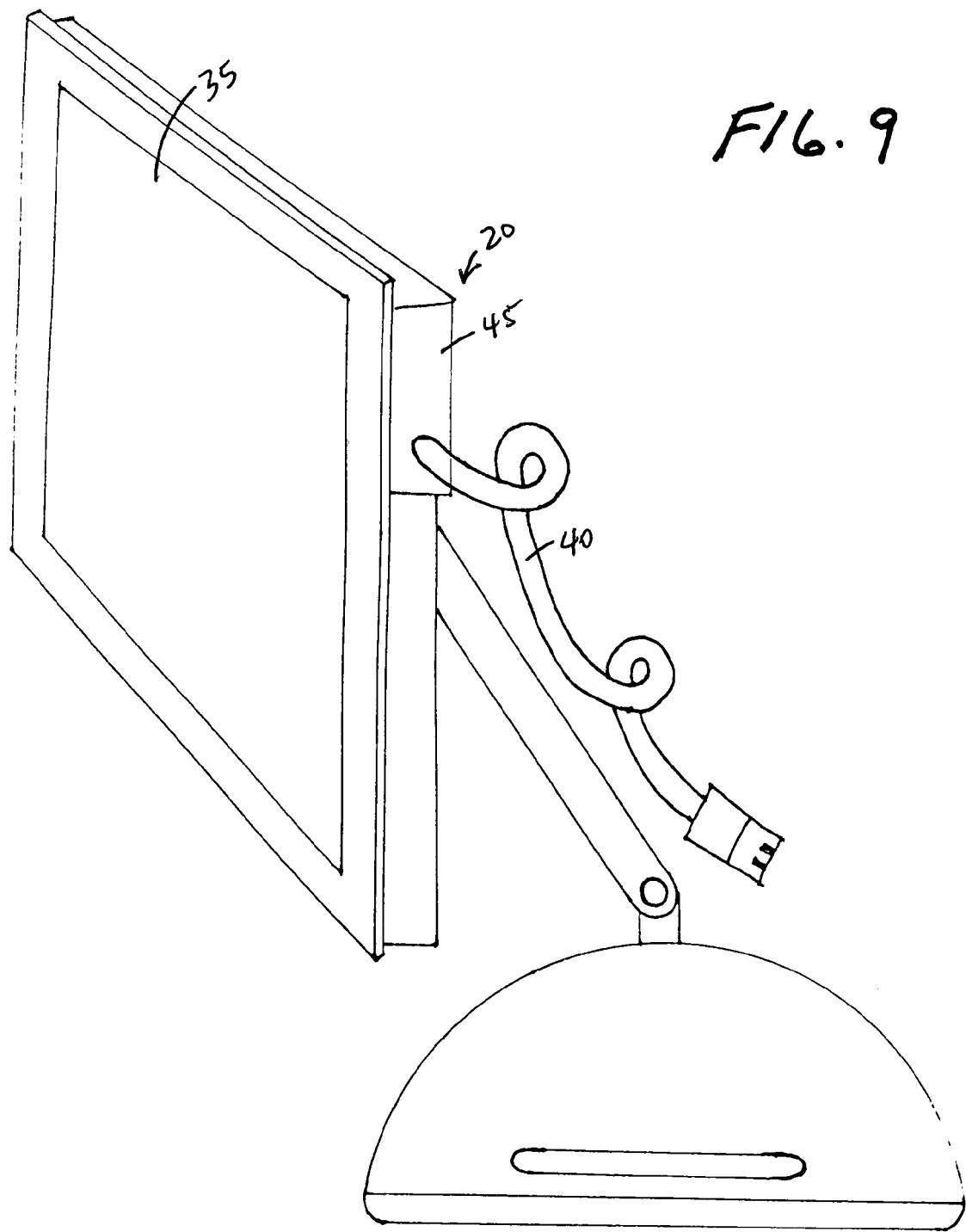

SLIPCOVER TOUCH INPUT APPARATUS FOR DISPLAYS OF COMPUTING DEVICES

BACKGROUND OF THE INVENTION

1. Field of the Invention:

This invention relates to a structure suitable for converting a non-touch screen display into a touch screen display comprising a slipcover for a display for computing devices and other electronic devices that not only protects the display but also allows for conversion of a regular or non-touch screen display to a touch screen display. By allowing for easy conversion of a regular or non-touch screen display to a touch screen display, the user will realize significant cost and timesavings, adaptability, and convenience.

2. Description of Related Art:

Prior to the present invention, in order to convert a non-touch screen display to a touch screen display, the user needed to take apart and disassemble the display to install a touch screen. This touch screen installation required additional time and money for a user. In addition, due to the complexity of installation process of a touch screen to a display and the wide range of quality of different touch screens available in the marketplace, many users were not satisfied with the quality of the touch screen products and/or time required for installation.

From the preceding description, it is apparent that the devices currently being used have significant disadvantages. Thus, important aspects of the technology used in the field of invention remain amenable to useful refinement.

SUMMARY OF THE INVENTION

The purpose of the present invention is to provide an easy and quick way to convert any display, including liquid crystal display (LCD) or flat-screen display, to a touch screen display without taking apart or disassembling the display. The present invention is placed, oriented, positioned, or slipped over the display to allow the non-touch screen display to become a touch screen display; there is also a connection from the internal circuitry or processing component(s) or controller of the touch screen to the computing device.

Another purpose of the present invention is to provide a slipcover that protects the display screen from physical injury or damage. Since the cost of displays or monitors or view screens for computing devices can be quite considerable, the slipcover can provide an economical way to protect the valuable display from injury or wear and tear.

Another purpose of the present invention is to allow for easy communication with a computing device with a touch screen interface. With the growing and popular use of mobile and laptop computers for presentations, this invention provides an easier input access through a touch screen than with using a stylus, mouse, or other external input device. This facilitation of the input process allows for maximizing the usefulness and portability of mobile computing.

Another purpose of the present invention is to provide an economical and affordable way to provide access to a touch screen to a single or multiple users. Since the invention can be removed and replaced on any display easily, this invention allows operators to best maximize their resources and to apply use of a touch screen when needed.

Another purpose of the present invention is to provide an easy and cost-effective way to convert a non-touch screen display to a touch screen display without having to physically take apart or disassemble the display and/or computing device to install a touch screen. For example, instead of having to convert many non-touch screen displays and integrated computer/display machines with an internally installed touch screen, the user simply needs to slip over the instant invention over the needed displays to make the necessary conversion into a touch screen displays.

Another purpose of the present invention allows for making computers more accessible to users with handicaps or disabilities that prevent them from accessing computers via traditional input devices such as the keyboard and the mouse. These particular touch screen users can take advantage of using a finger, stylus, or other easy to use input to engage the touch screen. Additionally, since the present invention facilitates the transformation of a regular non-touch screen display into a touch screen display, users with handicaps and/or disabilities are further able to enjoy the benefits of using touch screen input devices to access a computing device and the Internet.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 9 is view of another embodiment on a stand alone display.

DESCRIPTION OF THE PREFERRED EMBODIMENTS

Figure 1:
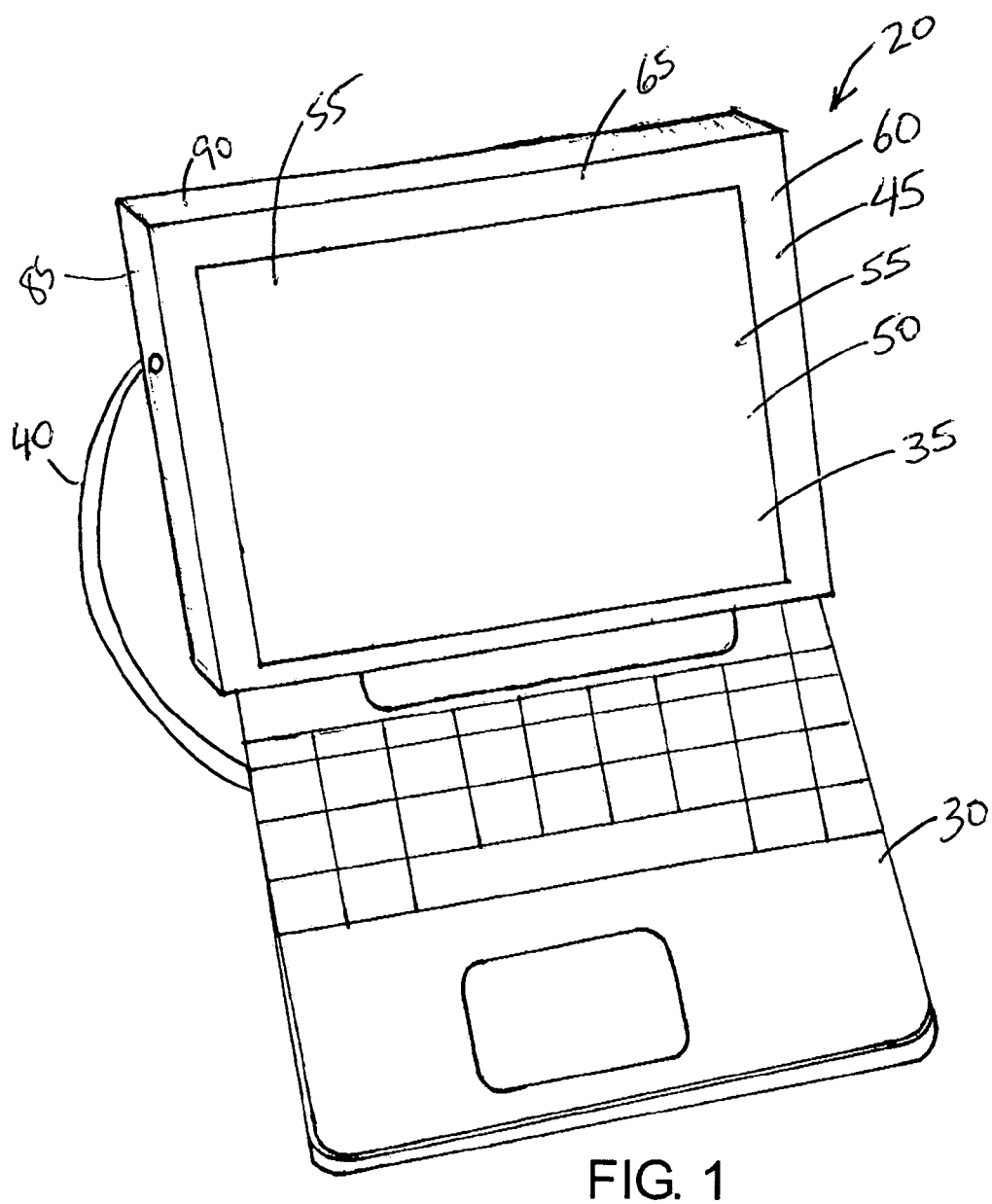
FIG. 1 is a view of the invention placed over a mobile or laptop computer.

Referring to FIG. 1–8, there is illustrated a structure or a touch screen slipcover assembly 20 for adjustably converting a non-touch screen display 25, including but not limited to a liquid crystal display (LCD) and a flat-panel display, to a touch screen display.

The touch screen slipcover 20 for a computing device has a touch screen 35 on one surface; this slipcover slips over and acts like a sheath or surrounding cover or glove over and around the display 25 for a computing device 30. A connection 40, such as a Universal Serial Bus (USB) cord, connects a controller (not shown) of the touch screen (input device) to the computing device 30. The controller may be located on the back surface of the slipcover or integrated and compartmentalized within the slipcover casing 45. This invention will convert any non-touch screen display to a touch screen display to receive input from a user based on touch or pressure or other touch screen technologies.

As shown in FIG. 1, there is a slipcover assembly 20, which is placed over the screen display 25 of a computing device or computer 30. The slipcover assembly 20 or slipcover structure 20 comprises a casing 45. This casing 45 has a window 50 or opening 50 for a touch screen 35 to be mounted and to mirror the view screen 55 of the display 25. This window and opening 50 of the casing 45 should mimic the position, location, and orientation of the display 25 so that the touch screen 35 will align properly with the display 25 and the view screen 55 of the display 25. In other words, the touch screen 35 and casing 45 will fit like a glove over the display 25 of the computing device 30 so that the user can view the view screen 55 of the display 25 through the opening 50 of the casing 45.

Further, the casing substantially surrounds the display and covers the outer portions of the display body and the view screen. By substantially surrounding the display, the casing provides further stability and protection to the display and the touch screen apparatus. As a result, from general use, the slipcover touch input apparatus will not be maladjusted or knocked off from the optimal viewing position. Also, the slipcover assembly will remain on the display until the user decides and intends to remove the slipcover assembly.

In addition, in another embodiment, the casing 45 can also have a protective layer instead of a touch screen to sit in the window or opening 50. This protective layer can be a glass, plastic composite, or a see-through mesh. In addition, this protective layer may also provide protection from interference or glare.

The casing 45 has at least one casing surface 60. In one embodiment, the casing 45 can have all smooth surfaces and avoid having edges, so that there is only one casing surface 60 around the slipcover assembly 20. In other embodiments, there will be multiple casing surfaces, including inner and outer casing surfaces, and this invention is not to be limited by the number of casing surfaces.

As shown in FIG. 1–4, there is at least one outer casing surface 65 and at least one inner casing surface 70. In FIG. 1–4, there is a first outer casing surface 75, a second outer casing surface 80, a third outer casing surface 85 (height), and a fourth outer casing surface (width) 90. In FIG. 1–4, there is also a first inner casing surface 95, a second inner casing surface 100, a third inner casing surface 105, and a fourth inner casing surface.

In addition, depending on how the touch screen 35 is placed within the casing window or opening 50, there may also be at least one casing window surface. The touch screen 35 may be flush with the at least one casing outer surface 65. In addition, the touch screen 35 may also be slightly below or above the at least one casing outer surface 65. The touch screen 35 can be installed to different heights in relation to the at least one outer casing surface 65.

The outer casing surfaces and the touch screen 35 form a shell or sheath or a partially enclosed space 120, which will slip around the display 25. The display 25 will act as a male piece, which will fit into the slipcover assembly 20, which will act as a female piece. The second casing outer surface 80 lies opposite to the touch screen 35. In addition, there is also a casing connection surface 125, which lies opposite to the fourth inner casing surface and fourth outer casing surface 90.

Additionally, the casing comprises at least one outer casing surface and at least one inner casing surface, whereby the at least one outer casing surface and the at least one inner casing surface define a space 120 for the display to fit and to substantially occupy.

Materials for the Casing:

The casing 45 can be made of a variety of different materials, such as a plastic or a composite, including a plastic composite. Also, the casings may employ an alloy or metal composite or a carbon fiber material. The casing material should be lightweight, yet sturdy and durable, and the casing possibly could be made of wood fibers or a cardboard composite.

Basic Touch Screen:

A basic touch screen typically has three main components: (1) touch screen or sensor; (2) a controller; and (3) software driver. A typical touch screen sensor employs a clear glass panel with a touch responsive surface. This touch screen sensor is placed and oriented over the display of the computing device (computer, DVD, gaming, kiosk, register, or other computing machine) so that the responsive area of the touch screen panel covers the viewable area or view screen of the display.

Through some sort of physical or wireless connection, a controller communicates the input data from the touch screen or sensor to the computing device. This controller (typically a computing card) may be integrated into the display or computing device. This controller may be mounted internally or externally to either the touch screen structure or the computing device or within an external structure. Some computing devices may require specialized controllers to connect the computing device to the touch screen.

The computing device may employ software or software drivers to interpret the input information from the touch screen that is sent from the controller. Some computing devices may not require separate software drivers or employ their own built-in touch screen software drivers.

Touch Screen:

The instant touch screen 35 or touch sensor 35 has an outer touch screen surface 130 and an inner touch screen surface 135. This invention is not limited to any particular type of touch screen or pressure sensitive input device.

This instant invention can incorporate a wide variety of different types of touch screens and pressure sensitive input devices. Examples of different kinds of touch screens and touch sensor technologies are Surface Acoustic Wave (SAW), Near Field Imaging, Capacitive, Analog Resistive; 5-Wire Resistive; 4-Wire Resistive; Pen-Touch Capacitive; and Infra-Red (IR). Typically, a sensor generally has an electrical current or signal passing through; touching the sensor screen causes a voltage or signal change; this voltage or signal change is used to determine the location (including 2-dimensional position) of the input or touch to the sensor screen. These types of touch screens are for example only and are not intended to limit the scope of different kinds of touch screen input devices that can be used with the instant invention.

In addition, the touch screen 35 and the casing window 50 imitate and mimic the position and the dimensions of the display 25. The touch screen 35 should be able to be mounted, installed, positioned, and fitted within the window or opening 50 of the casing 45. As shown in FIG. 1, the touch screen slipcover assembly or structure 20 is placed and positioned substantially over the display 25 as a sheath or similar to a pillowcase over a pillow. The slipcover assembly 20 substantially surrounds the display of the computing device, including the view screen and the much of the body of the display body. The view screen 55 of the display 25 will appear through the opening or window 50 of the casing 45, and the touch screen will substantially cover the view screen of the display 25. By mimicking, imitating, and simulating the position, orientation, and dimensions of the display 25, the touch screen slipcover assembly 20 can allow the non-touch screen display to become a touch screen display and allow the user to see through the touch screen to the display view screen.

Figure 2:
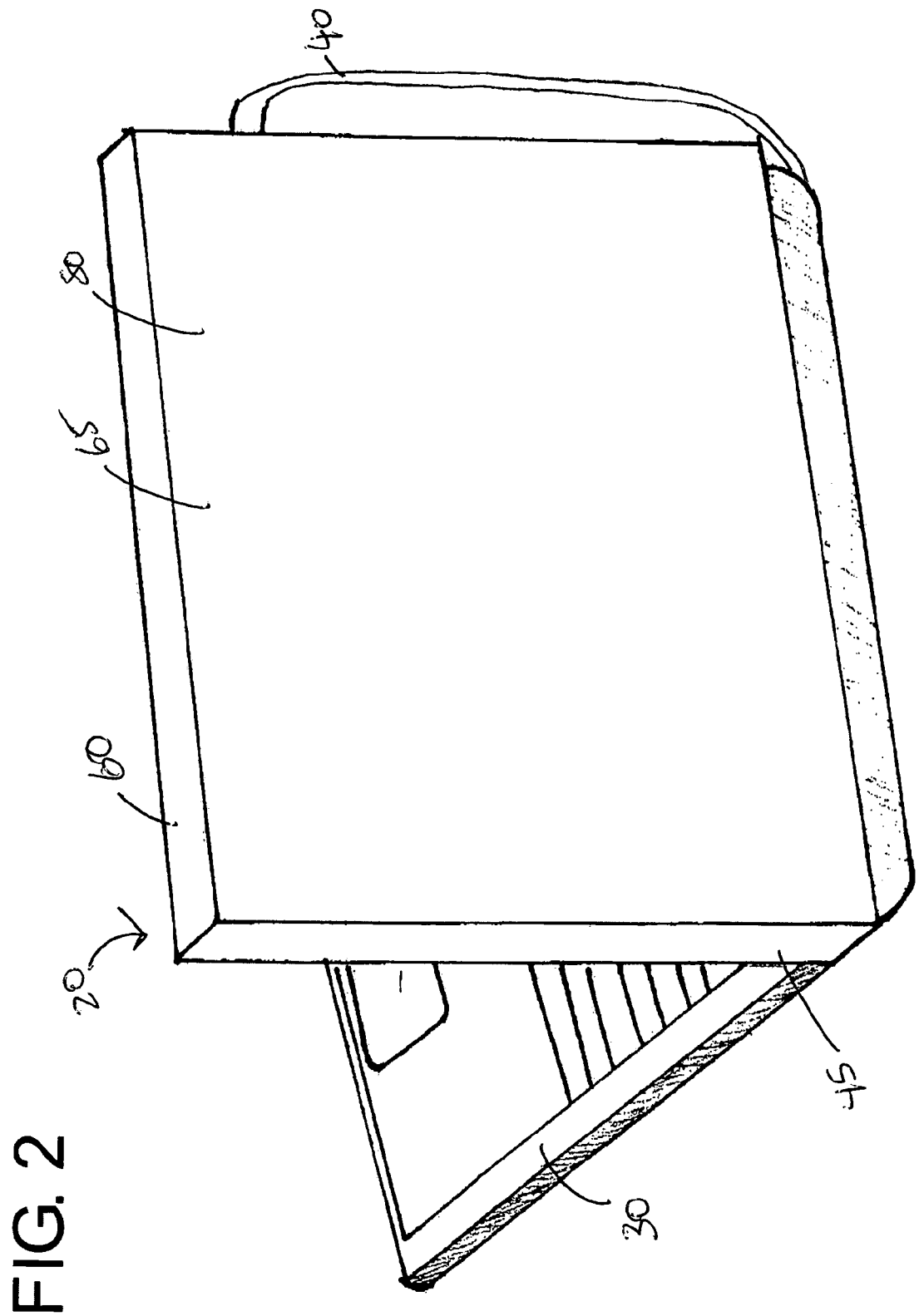
FIG. 2 is a rear view of the invention as shown in FIG. 1 on a mobile or laptop computer.
Figure 3:
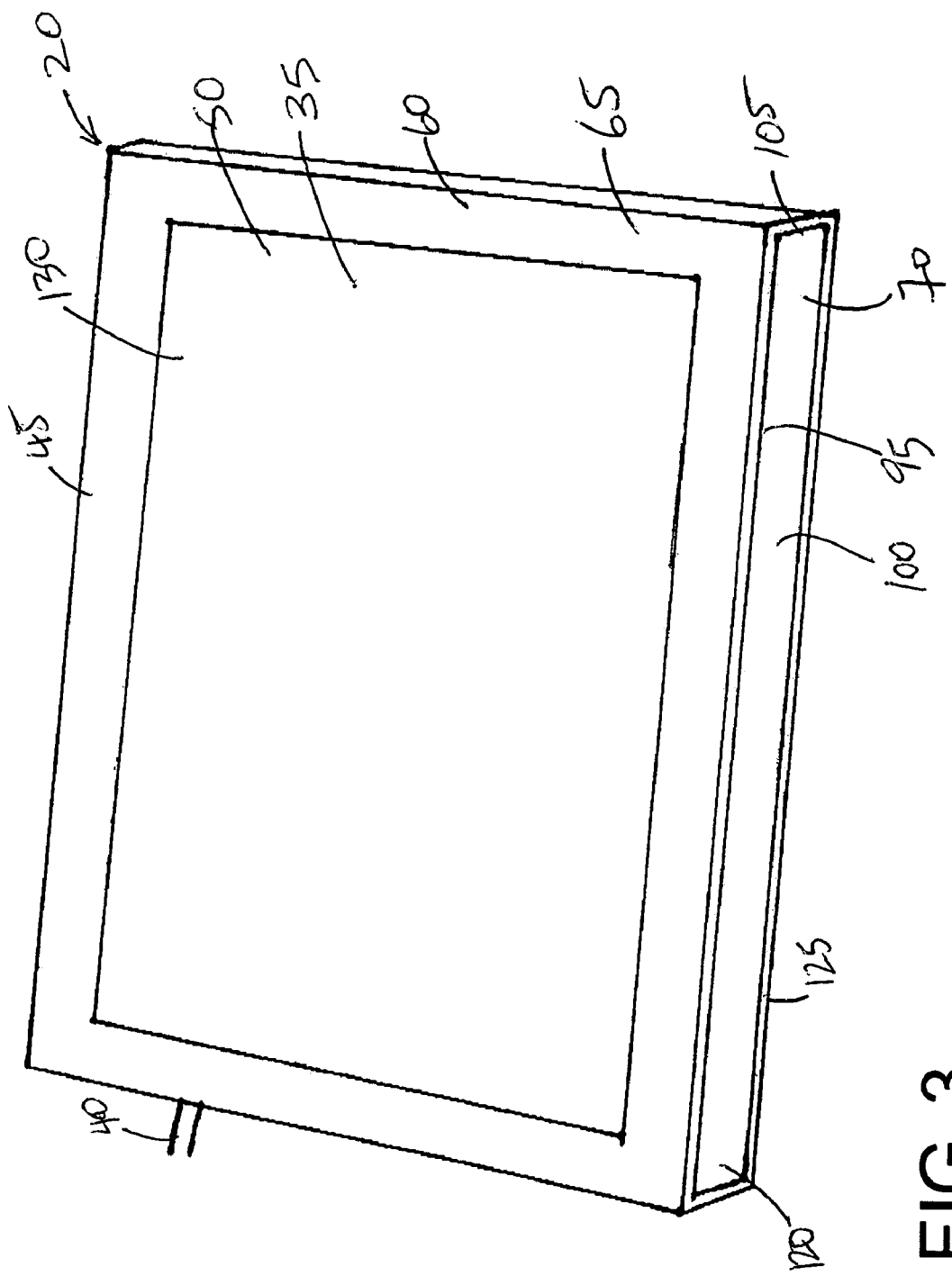
FIG. 3 is frontal view of the invention.
Figure 4:
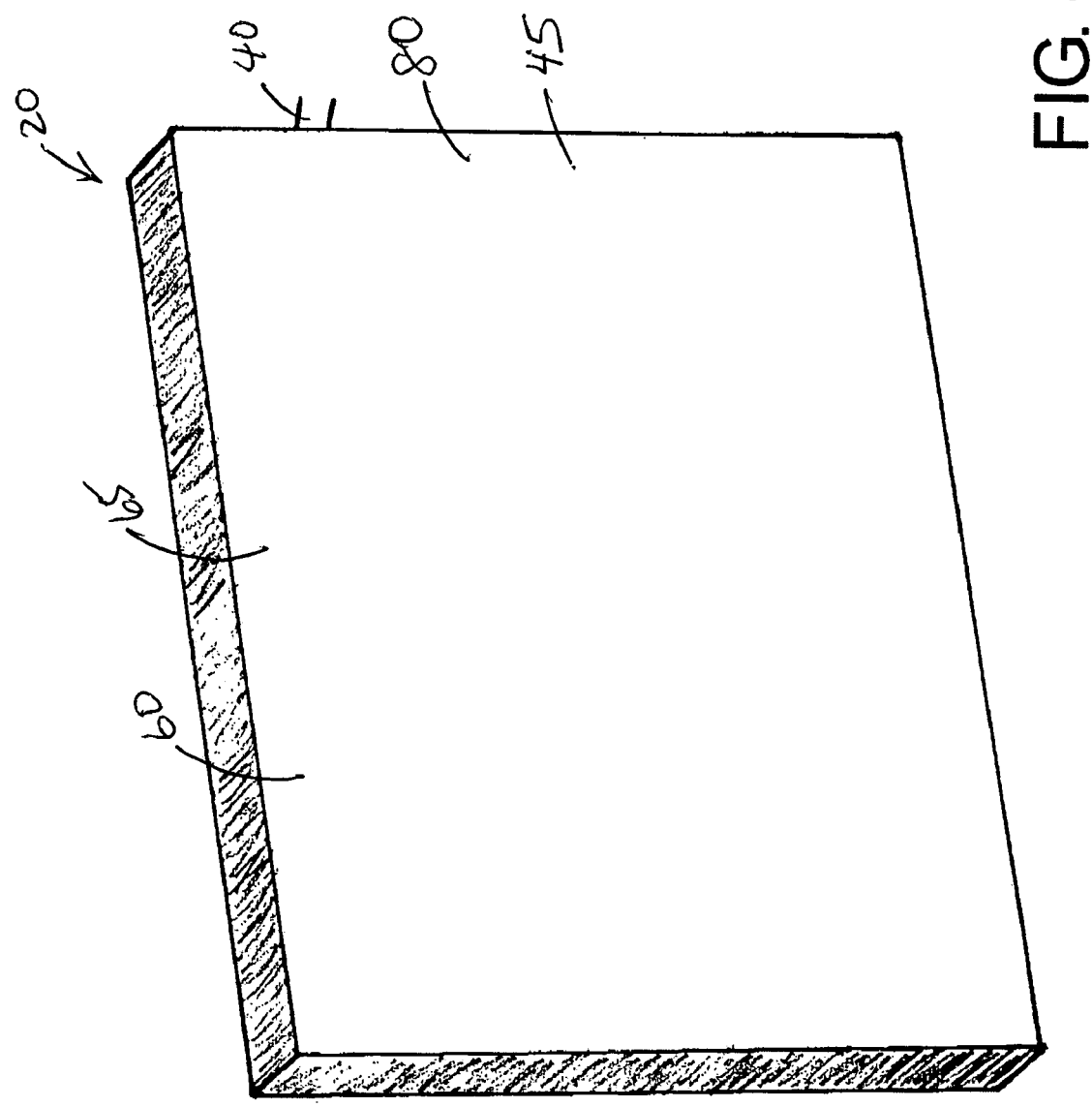
FIG. 4 is a rear view of the invention as shown in FIG. 3.
Figure 5:
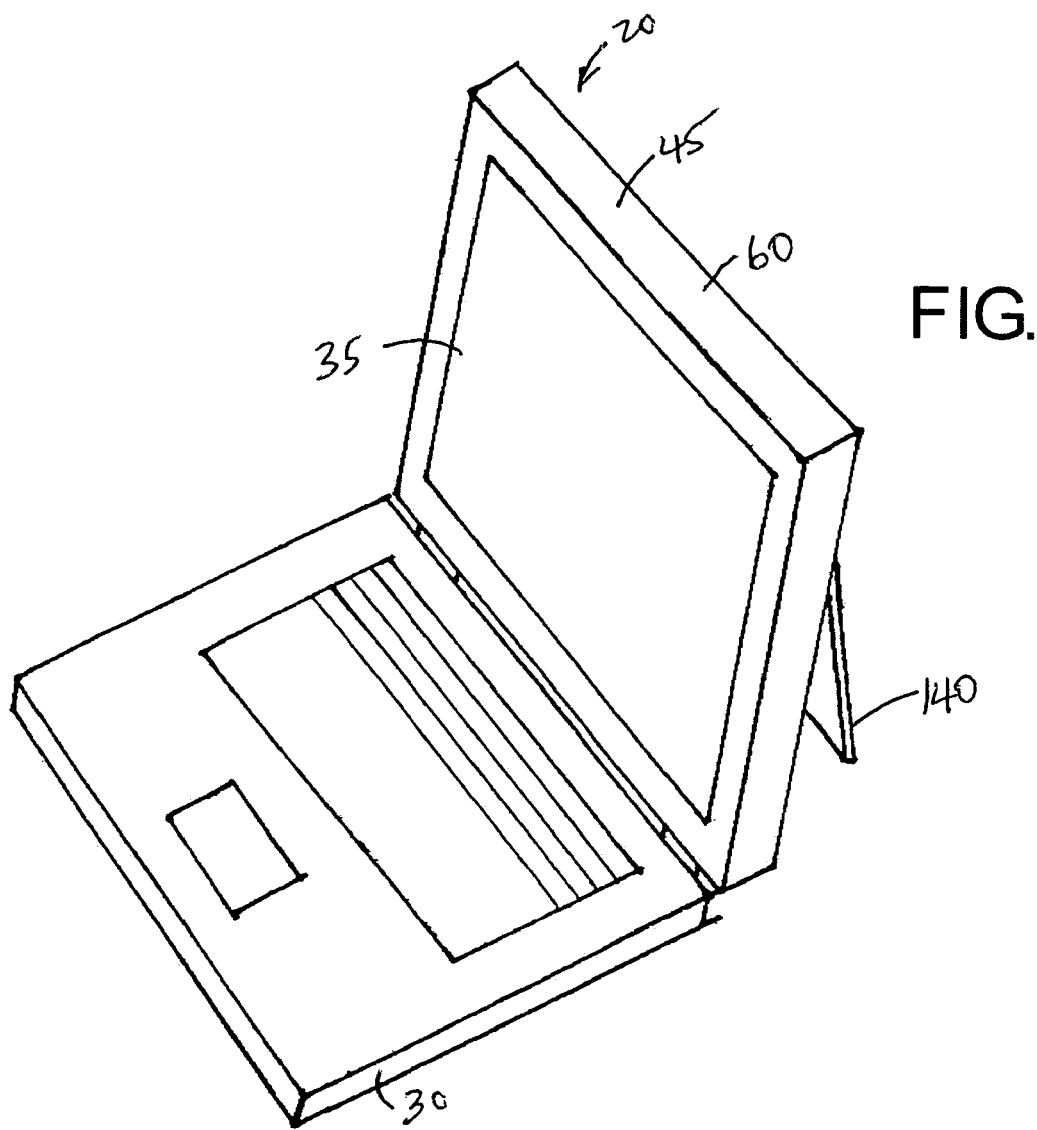
FIG. 5 shows another embodiment of the invention with special pivotable stand in a second or open position.
Figure 6:
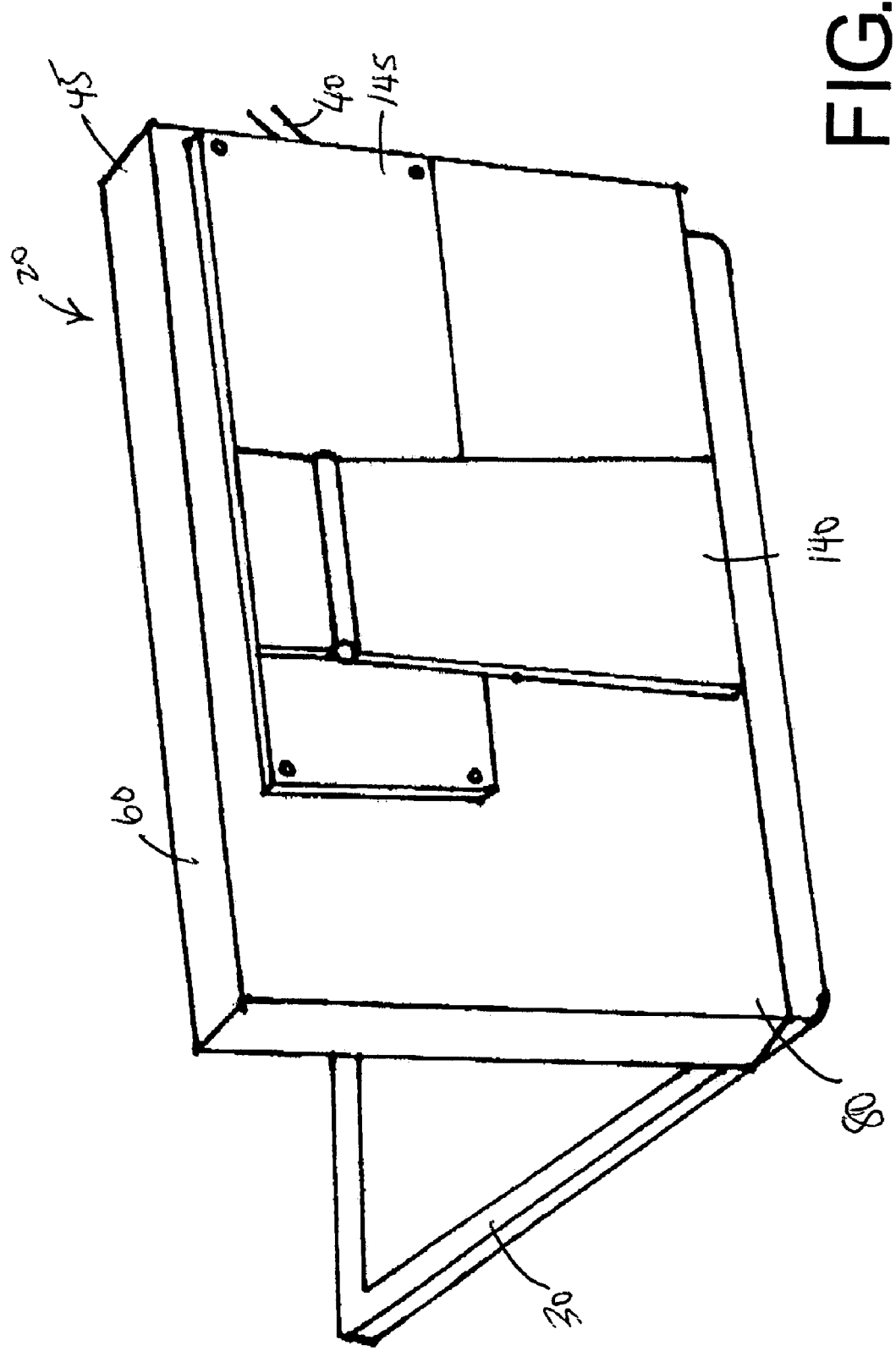
FIG. 6 is a rear view of the another embodiment with a pivotable stand in a first or closed position.
Figure 7:
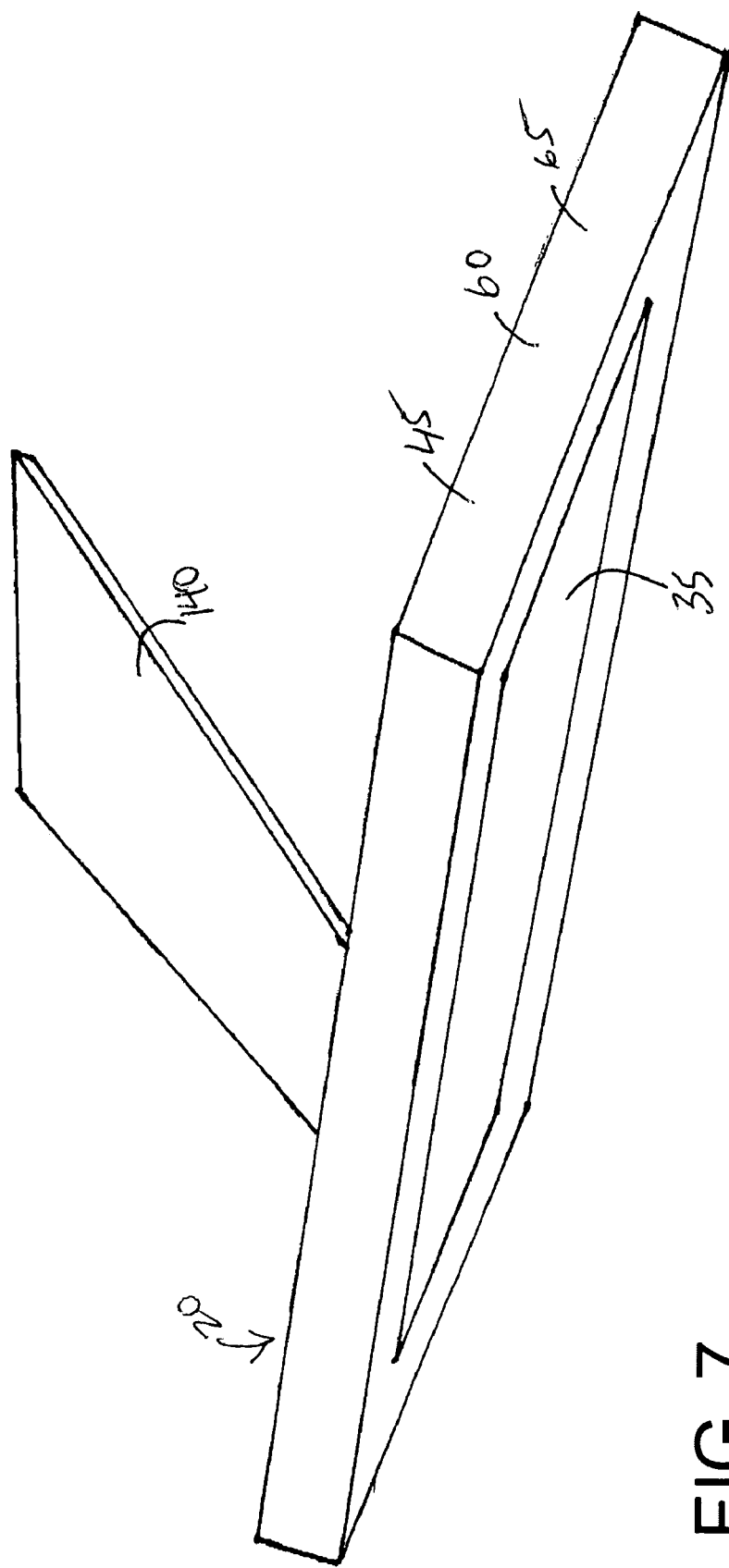
FIG. 7 is a side view of the another embodiment with a pivotable stand in a second or opened position.
Figure 8:
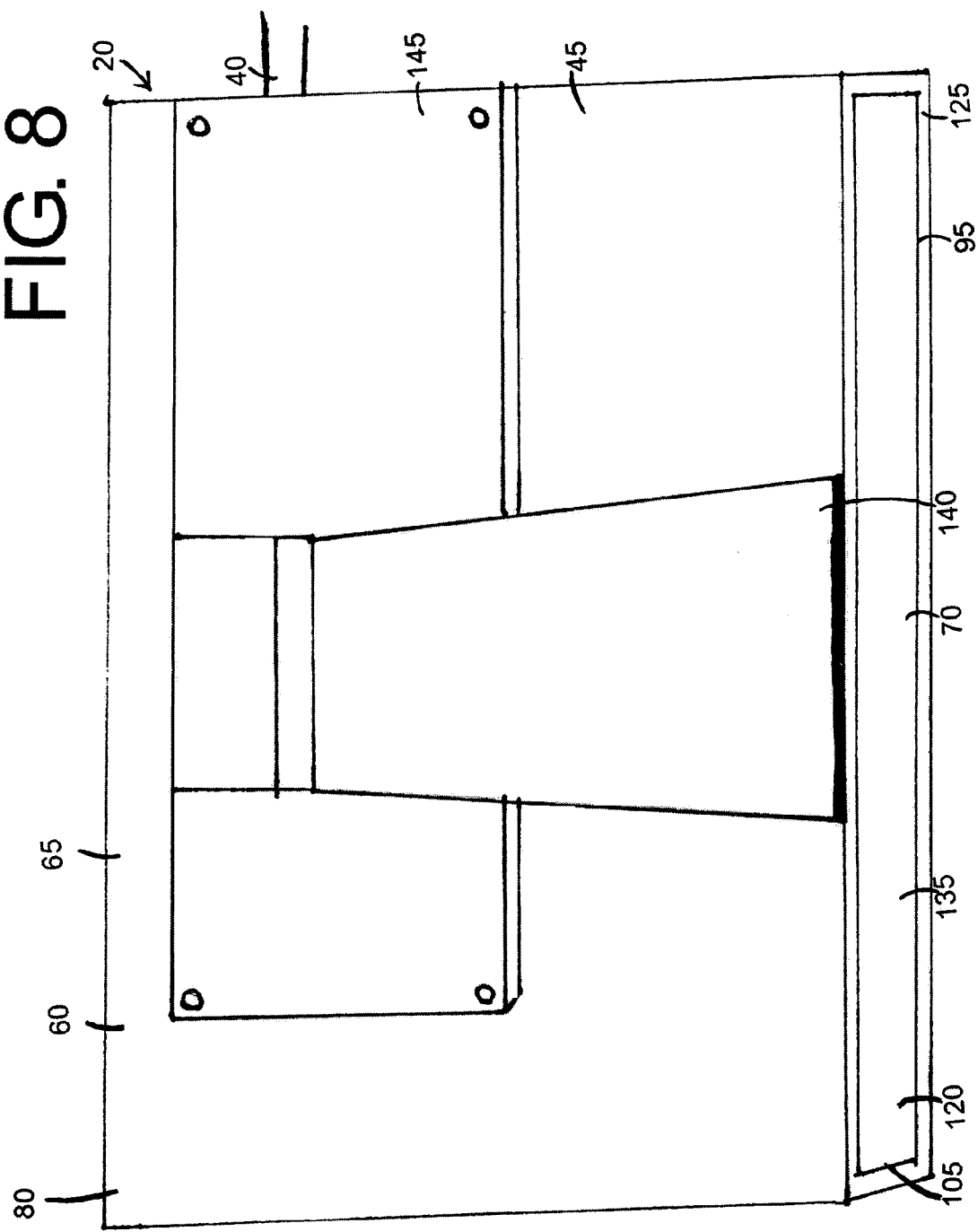
FIG. 8 is a rear view of another embodiment with a pivotable stand in a first or closed position.

Connection from Touch Screen to Computing Device:

There is a connection 40 to link the touch screen slipcover 20 to the computing device 30. As shown in FIG. 1-2, there is a wire connection 40 from the internal circuitry or controller of the touch screen to the computing device 35. This can be a variety of different connections such as Universal Serial Bus (USB), Fire Wire, serial cable, fiber optic cable, and wireless. This invention is not to be limited by the type of connection device, but this invention can use any possible connection from the touch screen to the computing device—physical or wireless connection.

In addition, in another embodiment, the touch screen slipcover may have a connection that fits within one of the outer surfaces of the casing or within the casing connection surface 125. For example, the slipcover 20 would have a male connection that would fit within a female connection on the computing device. Or, the slipcover would have a female connection that would accept a male connection from the computing device.

In another embodiment, the connection 40 between the touch screen slipcover and the computing device would not require a physical connection but could take advantage of wireless technology such as radio signals or infrared communication.

Slipcover for Stand Alone Display:

The slipcover touch screen assembly can be applied to a stand-alone display, such as a liquid crystal display (LCD) or flat-screen display or even a Cathode Ray Tube (CRT) display. As with the slipcover assembly for mobile computers, the slipcover assembly for stand-alone displays would use similar connection elements as described above. As shown in FIG. 9, this embodiment of the invention would slip over the stand-alone display, just like the embodiment for mobile or laptop computer displays.

This particular invention is considered for flat-screen or LCD displays due to the thin nature of these displays, but this invention should not be simply limited to these types of displays. This invention could be applied to other types of displays, such as large and bulky displays and plasma displays, and the slipcover dimensions would have to mimic and to imitate the display dimensions and position of the view screen accordingly. In addition, it is also possible to convert large view displays into touch screen displays.

Built-In Stand:

As shown in FIG. 5-8, the slipcover assembly may also have a built-in stand or strut 140 on the second casing outer surface 80. This adjustable stand or support 140 has a first or closed position (see FIG. 6) and a second or opened position (see FIG. 5). In the first position, the stand 140 lies flush against the second casing outer surface 80. In the second position, the stand is pivoted and can be swung out to forms an angle (typically, less than 90-degrees, but may be greater) from the second casing outer surface 80. This stand 140 will help support the slipcover assembly 20 and the display 25. The stand 140 can lean against the table, desk, or counter surface upon which the laptop or mobile computer lies. The stand may be positioned opposite to the opening 50 of the casing. The stand can be adjusted to a variety of different positions to allow for optimal viewing of the touch screen and the display.

This embodiment may employ one pivotable or adjustable stand 140 or a multitude of pivotable or adjustable stands. In the first position, the stand or stands 140 will be flush or hidden within the casing 45 or rest just above the casing surface 80. In the second position, the user will pull out and pivot the stand(s) 140 so that the stand(s) 140 will help support the weight of the slipcover assembly 20, including the touch screen and casing) and the display 25 in order to maintain an optimal and comfortable viewing angle for the user of the touch screen and display.

In addition, the stand 140 may also be detachable from the casing surface 80 so that the user may attach or detach the stand 140 depending on use and no need. The stand 140 may also be pivotally integrated into the casing body so that in the first position, the stand will be held flush against the casing outer surface. In the second position, the user can pull out the stand 140.

Touch Screen Circuitry Outer Box:

The circuitry or controller for the touch screen can be placed on a box or compartment 145 on the casing outer surface 65. In addition, this circuitry or controller for the touch screen can be internalized in the casing 45 so that there are no circuitry storage areas or box 145 that break the casing outer surface 65.

Anti-Theft Device or Lock for Slipcover:

This present invention allows for a lock to be placed on the slipcover and connected to a stationary object to avoid theft of the slipcover. In one embodiment, a hole is drilled into the casing so that a padlock or any other type of lock can secure the object from being moved or stolen. This anti-theft device is significant because the slipcover can be so easily installed and removed. Also, the user may also require that the touch screen slipcover be used for different employees with different computers. This allows for some flexibility in how users use their slipcover touch screen adapter for their computer equipment.

Another embodiment allows for an anti-theft deterrent device such as an alarm or an anti-motion sensor that would be activated if the structure is removed unintentionally.

Non-Touch Screen Embodiment:

In addition, this invention can also use a non-touch screen in the window or opening of the casing. This non-touch screen embodiment would act as a protective sheath or guard for the display. Since many current LCD or flat-screen displays are quite expensive, it would be prudent for users to protect their displays. In addition, the non-touch screen embodiment can use filters or see-through screens in the window to reduce glare on the display.

Method of Use:

To use the touch screen slipcover assembly 20, the user simply places the slipcover assembly 20 or casing with touch screen substantially over the display 25 of the computing device 30 so that the display view screen 55 is shown through the casing opening/window 50 and is covered by the touch screen 35. The user will connect the touch screen internal circuitry or processing components or controller to the computing device 35 with a physical connection 40 or with a wireless connection. Then, the non-touch screen display is automatically converted to a touch screen display.

If required, the user may also install software to allow the computing device and the controller to exchange and to interpret the input information from the touch screen sensor.

Further, if installed, the user may also pull out, pivot, adjust, and extend a stand from the casing outer surface to help support the slipcover assembly and the display (from a first position or closed position to a second or open position).

This invention is very useful because it provides an easy and cost-effective way for a user to convert a non-touch screen display to a touch screen display. The user has a tremendous amount of flexibility and ease of use because the touch screen slipcover assembly can be placed over several different computing device displays.

The user is able to save time and money with this invention and avoids having to transport his or her display and/or computing device to an installer and/or integrator to have the touch screen installed into the display. With the locking embodiment, the user is also able to securely fasten the slipcover assembly to the display.

The applications for touch screen displays are numerous in the military, retail, professional, and residential areas. With the growth of sophistication of computer input devices evolving from keyboards and mouse(s) to graphic user interfaces and touch screen devices, this invention provides a cost-effective and elegant solution to provide the user access to the added functionality and convenience of using a touch screen input device and interface with the computing device.

Kit for Slipcover Touch Input Apparatus for Displays for Computing Devices

The invention also applies to a kit that can be sold to the consumer to allow an easy and quick conversion of any display for a computing device to a touch screen display. For example, the kit would include installation instructions, the touch screen casing with touch screen or protective lens or film to fit within the opening or window of the casing; a connection (physical or wireless) from the touch screen internal circuitry to the computing device; and any required software drivers. In addition, there also may be touch screen cleaning materials such as solution or wipes. There may also be a detachable, pivotable, and adjustable stand for the casing as well.

A structure suitable for converting a non-touch screen display into a touch screen display for a computing device comprising: a touch screen; a casing; the casing having an opening for the touch screen; at least one casing surface; a controller for the touch screen; a connection from controller of the touch screen to the computing device, whereby the casing is positioned over and substantially around the display for the computing device such that the touch screen in the casing opening is oriented directly over the display to convert a non-touch screen display to a touch screen display. The connection to the computing device is a Universal Serial Bus, Fire Wire, wireless, or cable connection. The casing further comprises at least one outer casing surface and at least one inner casing surface, whereby the at least one outer casing surface and the at least one inner casing surface define a space for the display to fit. The casing comprises a plastic composite. The casing further comprises at least one pivotable stand, which is positioned opposite to the opening of the casing, whereby the at least one stand supports the structure and the display.

A structure suitable for converting a non-touch screen display into a touch screen display for a computing device comprising: a touch screen; a casing; the casing having an opening for the touch screen; at least one casing surface; a controller for the touch screen; a connection from controller of the touch screen to the computing device; the casing surface having at least one pivotable stand, whereby the casing is positioned over and substantially around the display for the computing device such that the touch screen in the casing opening is oriented directly over the display to convert a non-touch screen display to a touch screen display and whereby the at least one stand supports the casing and the display.

A method of using structure suitable for converting a non-touch screen display into a touch screen display for a computing device, said structure comprising a touch screen; a casing; the casing having an opening for the touch screen and at least one outer casing surface and at least one inner casing surface; the at least one outer casing surface and the at least one inner casing surface further defining a space for the display; a controller for the touch screen; a connection from the controller of the touch screen to the computing device, comprising the following steps:

(1) placing the casing over and substantially around the display into the space defined by the at least one outer casing surface and the at least one inner casing surface; and (2) attaching the connection from the controller of the touch screen to the computing device, whereby the touch screen in the casing opening is oriented directly over the display to convert a non-touch screen display to a touch screen display. The method further comprises installing a software driver for the touch screen into the computing device. The method further comprises moving a pivotable stand on the casing from a first closed position to a second opened position.

What is claimed is:

1. A structure suitable for converting a non-touch screen display into a touch screen display for a computing device comprising:
    a touch screen;
    a casing;
    the casing having a first side and a second side, the first and second sides are oriented to face to each other and are non-pivoting in relation to one another;
    the first side of the casing having an opening for the touch screen;
    the second side of the casing being closed and lacking any openings;
    at least one casing surface;
    a controller for the touch screen;
    a computing device software driver for the touch screen;
    a connection from the controller of the touch screen to the computing device,
    whereby the casing is positioned over and substantially around the display for the computing device such that the touch screen in the casing opening is oriented directly over the display to convert a non-touch screen display to a touch screen display.

2. The structure of claim 1 wherein the connection to the computing device is a Universal Serial Bus, Fire Wire, wireless, or cable connection.

3. The structure of claim 1 wherein the casing further comprises at least one outer casing surface and at least one inner casing surface, whereby the at least one outer casing surface and the at least one inner casing surface define a space for the display to fit.

4. The structure of claim 1 wherein the casing comprises a plastic composite.

5. The structure of claim 1 wherein the casing further comprises at least one pivotable stand, which is positioned opposite to the opening of the casing, whereby the at least one stand supports the structure and the display.

6. A structure suitable for converting a non-touch screen display into a touch screen display for a computing device comprising:
- a touch screen;
- a casing;
- the casing having a first side and a second side, the first and second sides are oriented to face to each other;
- the first side of the casing having an opening for the touch screen;
- the second side of the casing being closed and lacking any openings;
- at least one casing surface;
- a controller for the touch screen;
- a computing device software driver for the touch screen;
- a connection from the controller of the touch screen to the computing device;
- whereby the casing is positioned over and substantially around the display for the computing device such that the touch screen in the casing opening is oriented directly over the display to convert a non-touch screen display to a touch screen display.

7. The structure of claim 6 wherein the connection to the computing device is a Universal Serial Bus, Fire Wire, wireless, or cable connection.

8. The structure of claim 6 wherein the casing further comprises at least one outer casing surface and at least one inner casing surface, whereby the at least one outer casing surface and the at least one inner casing surface define a space for the display to fit.

9. The structure of claim 6 wherein the casing comprises a plastic composite.

10. The structure of claim 6 wherein the casing further comprises at least one pivotable stand, which is positioned on the second side of the casing, whereby the at least one stand supports the structure and the display.

11. A method of using structure suitable for converting a non-touch screen display into a touch screen display for a computing device, said structure comprising a touch screen; a casing; the casing having a first side and a second side, the first and second sides are oriented to face to each other; the first side of the casing having an opening for the touch screen; the second side of the casing being closed and lacking any openings; the casing having at least one outer casing surface and at least one inner casing surface; the at least one outer casing surface and the at least one inner casing surface further defining a space for the display; a controller for the touch screen; a computing device software driver for the touch screen; a connection from the controller of the touch screen to the computing device, comprising the following steps:
- Placing the casing over and substantially around the display into the space defined by the at least one outer casing surface and the at least one inner casing surface;
- Installing the computing device software driver; and
- Attaching the connection from the controller of the touch screen to the computing device,
- Whereby the touch screen in the casing opening is oriented directly over the display to convert a non-touch screen display to a touch screen display.

12. The method of claim 11 further comprising moving a pivotable stand on the casing from a first closed position to a second opened position.

* * * * *